United States Patent Office 3,352,896
Patented Nov. 14, 1967

3,352,896
BIS(3-HYDROXY-4-BENZOYLPHENOXY)SILANES
Hans Dressler, Pitcairn, and Kenneth G. Reabe, Delmont, Pa., assignors to Koppers Company, Inc., a corporation of Delaware
No Drawing. Filed June 17, 1964, Ser. No. 375,968
3 Claims. (Cl. 260—448.8)

ABSTRACT OF THE DISCLOSURE

Bis(3-hydroxy-4-benzoylphenoxy) diphenyl silane and bis(3-hydroxy-4-benzoylphenoxy) dialkyl silane are presented as new compositions of matter. The compositions are useful as ultraviolet light stabilizers in plastic materials.

---

This invention relates to ultraviolet light stabilizers for plastics. In one specific aspect it relates to plastic compositions stabilized against degradation resulting from exposure to ultraviolet radiation.

It is well known that many plastic materials tend to undergo deterioration upon exposure to ultraviolet radiation. Light having wave lengths of about 290–400 millimicrons causes photocatalyzed changes, such as yellowing or embrittlement, in unstabilized polymers. This is particularly undesirable for colorless translucent and transparent plastics which are required to withstand long exposure to intense sunlight. To overcome this problem it is usually necessary to stabilize plastics, such as for use in translucent roofing, transparent structures, protective coatings, impact resistant windows and decorative structures, which are subjected to prolonged exposure to ultraviolet radiation.

In recent years, organic compounds have become available which can absorb ultraviolet light and convert it to less harmful forms of energy such as heat, vibrational energy or less harmful radiation. These organic stabilizers, in addition to absorbing ultraviolet radiation in the selected range for the plastic material being treated, must be compatible with the plastic, have little or no initial color, be reasonably inexpensive, be chemically stable, and have a low toxicity especially for stabilizing plastics used in the food industry.

As a general rule, an effective ultraviolet light stabilizer should have a molar extinction coefficient ($\epsilon$) of about 10,000, that is, the log $\epsilon$ of the molar extinction coefficient is equal to or greater than 4.0 in the 300–400 millimicron spectral region to have potential value as an ultraviolet light stabilizer for plastics. However, individual plastics are generally most susceptible to deterioration by radiation of particular wave lengths. Thus, polyethylene and polystyrene are susceptible to radiation having a wave length of 300–320 millimicrons, while polypropylene is most sensitive to radiation at 370 millimicrons. One disadvantage of presently available commercial stabilizers is that their extinction coefficient is too low over a broad band in the ultraviolet light region to be effective for general use.

Quite surprisingly we have discovered that certain organic silane derivatives are compatible with a large number of plastic materials and exhibit outstanding ultraviolet light absorbing properties over a wide range. These compounds do not impart any substantial color to transparent colorless plastics.

It is therefore an object of the present invention to provide a novel composition which is resistant to degradation by ultraviolet radiation.

It is another object of the present invention to provide plastic compositions containing the novel organic silane derivatives which are substantially resistant to ultraviolet deterioration.

In accordance with the present invention, we have discovered that derivatives of bis(3-hydroxy-4-benzoylphenoxy)silane are particularly useful as ultraviolet light stabilizing agents for plastic materials. These compounds have the formula

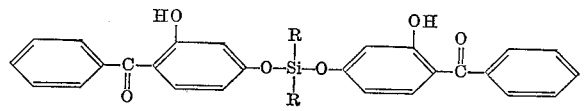

wherein R is a member selected from the group consisting of phenyl and alkyl having from 1–12 carbon atoms. The compounds of the present invention are particularly compatible with polyethylene and polypropylene and give excellent stabilization of these plastics against deteriorating effects of ultraviolet light without causing any substantial discoloration of the plastics.

The novel ultraviolet light stabilizer can be readily incorporated into the plastic material by various standard procedures. In one technique, the dry stabilizer in powdered form is mixed with a powdered or granular plastic and the mixture is then appropriately treated by molding or extruding. In another procedure an aqueous suspension or emulsion of finely divided polymeric material may be admixed wtih a suspension or emulsion of the stabilizing agent. Alternatively it is possible to spray or mix a polymeric material in powdered or granular form with a solution or dispersion of the ultraviolet light absorbing agent in an appropriate solvent such as hexane or benzene. It is also possible to incorporate the ultraviolet absorbing agent in a finished article by introducing the plastic material into a bath containing the ultraviolet light absorbing agent in an appropriate liquid solvent and permitting the plastic material to remain in the bath for some time until the plastic has been properly treated. Thereafter, the material is dried to remove any of the remaining solvent. Plastic material in the form of fibers and films may also be sprayed with a solution or suspension of the agent absorbing ultraviolet rays in a solvent or dispersant by any standard technique.

The plastic material should contain a stabilizing amount of the ultraviolet light absorbing agent, that is, the amount of stabilizing agent sufficient to prevent deterioration and embrittlement of the plastic material. The amount of stabilizing agent to be used will depend to a large extent upon the amount of exposure to which plastic is subjected and the nature of the plastic to be treated. The agent is generally added in an amount of between 0.01 and 5 percent by weight of the plastic material and preferably between 0.1 to 4 percent by weight.

The stabilizing agent imparts protection against ultraviolet radiation to numerous plastic materials which are sensitive to ultraviolet light. These include, for example, clear films made of polyester resins, polyvinyl chloride and celluose acetate which are used in packaging dye, textile articles and automobile seat covers. The agent also protects flame resistant halogen containing polyesters and styrene modified maleate glycol resins used in the preparation of glass fiber reinforced structural panels which are subject to discoloration on outdoor exposure. The ultraviolet stabilizer is particularly effective for protecting polyethylene, polypropylene, polystyrene, polyvinyl acetate, polyvinyl chloride, copolymers of viny chloride and vinylidene chloride, cellulose resins such as nitrocellulose, ethylcellulose and cellulose acetate and numerous other materials. One outstanding property of the stabilizing agent is its heat stability making it particularly desirable when high molding or extrusion temperatures are required, e.g., for polycarbonates. The agent can be used alone or together with other additives such as fillers, antioxidants, pigments, etc.

The invention is further illustrated in the following examples:

Example I

A mixture of 10.7 g. (0.05 mole) of 4-benzoylresorcinol, 6.3 g. (0.025 mole) of diphenyldichlorosilane, and 80 ml. of benzene was refluxed in a nitrogen atmosphere. After 8 hours the initially brisk evolution of HCl had nearly ceased. On cooling and standing, 1.2 g. of 4-benzoylresorcinol (11 percent recovery) crystallized from the yellow solution, and was filtered off and dried (M.P. and mixed M.P. 141–5° C.).

The filtrate was washed with two 50 ml. portions of water and extracted with 50 ml. of 5 percent aqueous sodium carbonate solution. Acidification of the sodium carbonate extract precipitated 1.1 g. (10 percent recovery) of unreacted 4-benzoylresorcinol (M.P. 145–7° C.).

The organic phase was washed with 50 ml. of water, dried over magnesium sulfate, filtered and the solvent was evaporated on the steam bath. A viscous light yellow oil weighing 13.2 g. (86 percent yield) was obtained. The product exhibited infrared absorptions consistent with the structure, bis(3 - hydroxy - 4-benzoylphenoxy)diphenylsilane.

Example II

A mixture of 10.7 g. 0.05 mole) of 4-benzoylresorcinol, 6.3 g. (0.025 mole) of diphenyldichlorosilane, and 80 ml. toluene as the solvent was refluxed in a nitrogen atmosphere for 24 hours, after which no further hydrogen chloride evolution was detected. The toluene was distilled off at atmospheric pressure to a pot temperature of 150° C. A small amount of HCl liberation was noticeable, and the residue was heated for two hours at 150–200° C. until no further HCl was evolved.

On cooling the residue (13.5 g., 88 percent yield) set to a pale, brittle, resinous solid (M.P. 60–65° C.). The infrared spectrum of the resinous solid was identical to that of Example I. The product, bis(3-hydroxy-4-benzoylphenoxy)diphenylsilane had a log ε (molar extinction coefficient) equal to or greater than 4.0 in the spectral region of 290–298 and 311–343 millimicrons.

Example III

The product of Example II, bis(3-hydroxy-4-benzoylphenoxy)diphenylsilane, was tested to determine its ability to stabilize polystyrene against ultraviolet light degradation. The stabilizer in varying amounts was blended with 100 parts of polystyrene beads by rolling in a jar mill. The stabilized beads and a control sample were extruded into pellets from which discs 2 inches in diameter and ⅛ inch thick were molded by injection molding. These molded discs were then exposed to ultraviolet radiation under a 325 watt Hanovia lamp for 120 hours. A Yellowness Index, which represents the relative degree of yellow coloration based upon spectrophotometric analysis, was determined for the samples of each of the compositions. The difference in the Yellowness Index before and after exposure or the amount of discoloration caused by the ultraviolet radiation is designated as the "Yellowness Factor." Results of the test are given in the table below.

TABLE I

| Stabilizer | Weight Percent | Yellowness Index | | Yellowness Factor |
|---|---|---|---|---|
| | | Before Exposure | After Exposure | |
| Bis(3-hydroxy-4-benzoylphenoxy) diphenylsilane | 0.1 | 8.2 | 9.8 | 1.6 |
| Do | 0.05 | 8.2 | 10.4 | 2.2 |
| Do | 0.02 | 5.4 | 9.6 | 4.2 |
| Control | None | 8.4 | 15.3 | 6.9 |

Example IV

One part of bis(3-hydroxy-4-benzoylphenoxy)diphenylsilane was blended with 100 parts of low density polyethylene and 0.05 part 4,4'-thio-bis(6-t-butyl-m-cresol) by milling on a two roll mill at 320° F. for five minutes. The clear thin films, 0.05 mm. thick, were molded from the stabilized resin and visual inspection indicated that the resin and the stabilizer were completely compatible. These films were exposed for 500 hours to the light of an ultraviolet lamp. The stabilized films remained substantially unchanged and no embrittlement could be ascertained while the unstabilized film showed discoloration and embrittlement.

Similar results are obtained when polypropylene, copolymers of vinylidene chloride and vinyl chloride, or styrene modified maleicglycol polyesters are used in the foregoing example.

Example V

A mixture of 10.7 g. (0.05 mole) of 4-benzoylresorcinol, 8.13 g. (0.025 mole) of di-n-octyldichlorosilane and 80 ml. of toluene were stirred and refluxed in a nitrogen atmosphere for 24 hours, after which time no further evolution of hydrogen chloride could be detected. The toluene was distilled off to a temperature of 150° C. and the residual mass heated under full aspirator vacuum for 4 hours on a steam bath. The residual viscous oil exhibited infrared absorptions consistent with bis-(3-hydroxy-4-benzoyl-phenoxy)di-n-octylsilane.

The product when incorporated in an amount of 0.01–5 percent by weight into polystyrene, polyethylene, and polypropylene acts as a stabilizer against deterioration by ultraviolet light.

We claim:

1. A composition of matter having the formula:

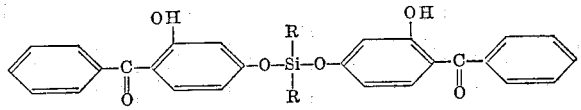

wherein R is a member selected from the group consisting of phenyl and alkyl having from 1–12 carbon atoms.

2. The composition of claim 1 wherein R is phenyl.

3. The composition of claim 1 wherein R is alkyl having 1–12 carbon atoms.

References Cited

UNITED STATES PATENTS 2,950,986  8/1960  Bailey et al. _____ 260—448.8 X
3,270,133  8/1966  Holub _____ 260—448.8 X TOBIAS E. LEVOW, Primary Examiner.

HELEN M. McCARTHY, Examiner.

P. F. SHAVER, Assistant Examiner.